(12) United States Patent
Dogan

(10) Patent No.: US 7,156,454 B1
(45) Date of Patent: Jan. 2, 2007

(54) MECHANISM FOR PREVENTING CLOSURE OF AUTOMOBILE DOORS

(75) Inventor: Baris Dogan, Goztepe/Istanbul (TR)

(73) Assignees: Ford Global Technologies, LLC, Dearborn, MI (US); Ford Otomotiv Sanayi Anonim Sirketi, Istanbul (TR)

( * ) Notice: Subject to any disclaimer, the term of this patent is extended or adjusted under 35 U.S.C. 154(b) by 19 days.

(21) Appl. No.: 11/149,840

(22) Filed: Jun. 10, 2005

(51) Int. Cl.
*B60J 5/04* (2006.01)
*B60J 5/06* (2006.01)

(52) U.S. Cl. .............. 296/207; 49/26; 49/383; 16/83; 296/155

(58) Field of Classification Search ........... 296/207, 296/155; 49/26, 383, 462; 16/82, 83
See application file for complete search history.

(56) References Cited

U.S. PATENT DOCUMENTS

| | | | | |
|---|---|---|---|---|
| 1,829,312 A * | 10/1931 | Thomas | ........... | 16/82 |
| 2,955,871 A | 10/1960 | Himka | ........... | 296/44 |
| 3,231,880 A * | 1/1966 | Stein | ........... | 49/26 |
| 4,502,246 A | 3/1985 | Minami | ........... | 49/322 |
| 4,804,223 A | 2/1989 | Iati | ........... | 296/152 |
| 5,074,073 A * | 12/1991 | Zwebner | ........... | 49/26 |
| 5,895,089 A | 4/1999 | Singh | ........... | 296/207 |
| 6,145,918 A * | 11/2000 | Wilbanks, II | ........... | 296/146.1 |
| 6,487,751 B1 | 12/2002 | Renaud | ........... | 16/83 |
| 2002/0189168 A1* | 12/2002 | Sicuranza | ........... | 49/26 |
| 2003/0085578 A1 | 5/2003 | Bromhall | ........... | 292/216 |

* cited by examiner

*Primary Examiner*—Dennis H. Pedder
(74) *Attorney, Agent, or Firm*—Ford Global Technologies, LLC

(57) ABSTRACT

A linkage mechanism operably associated with the front and rear doors of an automotive vehicle that pivots a bumper device into an interfering position with respect to the closing of the front door against the B-pillar of the vehicle when the rear door remains opened. The linkage mechanism includes a spring-loaded actuation lever that moves in response to the opening of the rear door to cause through connecting links the pivotal movement of the bumper device from a retracted position to an interfering position to interfere with the closing of the front door. The closing of the rear door causes the retraction of the pivoted bumper device to enable the closing of the front door. A manually activated stop lever is pivotally movable against the bumper device to prevent the pivotal movement thereof out of the retracted position even when the rear door is opened.

20 Claims, 4 Drawing Sheets

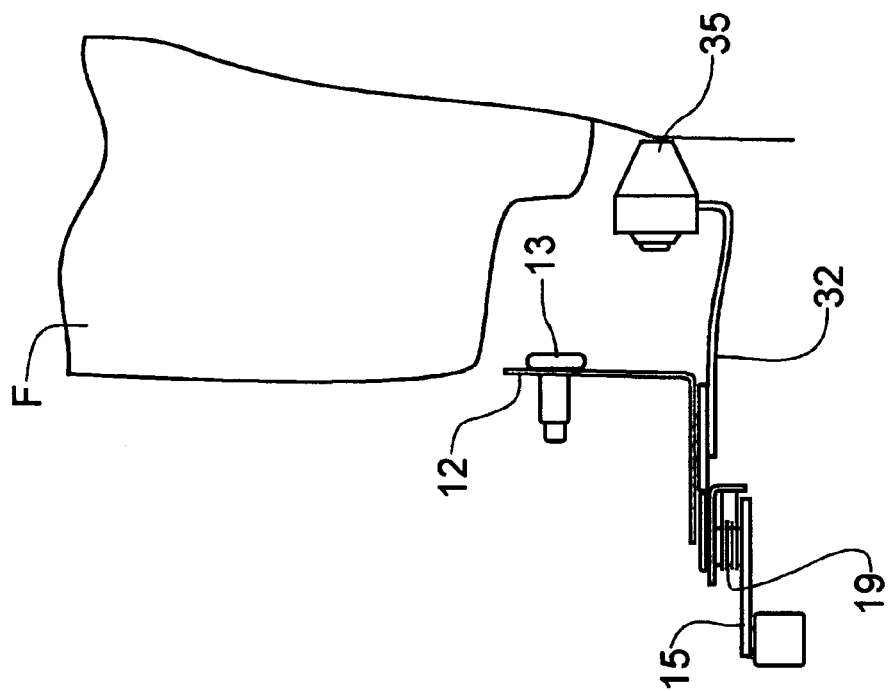
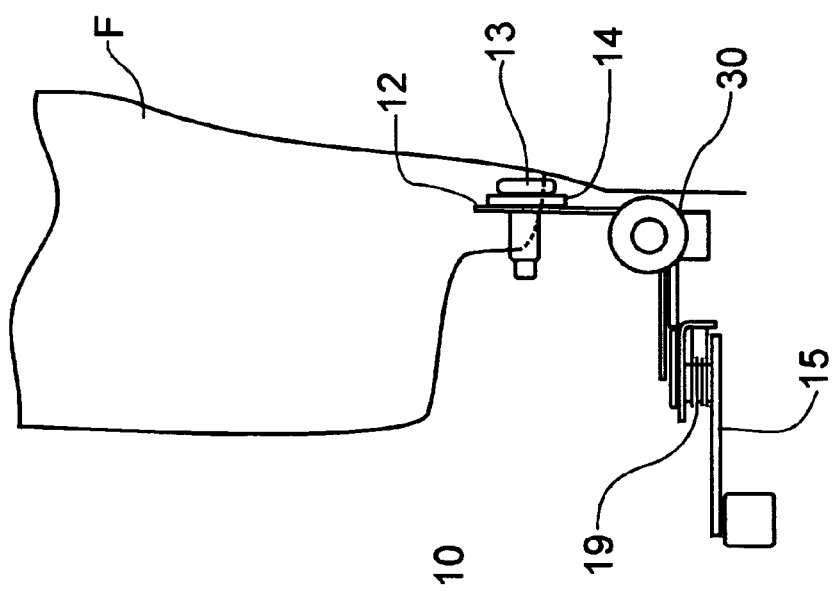

MECHANISM FOR PREVENTING CLOSURE OF AUTOMOBILE DOORS

FIELD OF THE INVENTION

This invention relates to a mechanism for preventing injury to fingers from closing automotive doors and, more particularly, to a linkage associated with a sliding rear door that prevents the front door from closing when the rear door is opened.

BACKGROUND OF THE INVENTION

Automotive vehicle are manufactured with an exposed B-pillar between the front and rear seats, or the front and second row of seats for those vehicles having more than two rows of seats. In some automobiles, such as vans and mini-vans, the front door is pivoted at the front A-pillar and the rear door is supported in a track for sliding movement between a closed position in which the sliding rear door is closed against the B-pillar, and an open position in which the sliding rear door is moved rearwardly from the B-pillar.

Passengers sitting in the second row of seats often desire to grip a portion of the vehicle to gain leverage or assistance in exiting the vehicle from the second row of seats. The B-pillar is the typical structure grabbed by such passengers. When the passenger grasps the B-pillar for support, both the pivoted front door and the sliding rear door are customarily opened. If the front door is inadvertently closed while the passenger in the rear seat is grasping the B-pillar for support, the fingers of the passenger can be caught between the B-pillar and the closing front door. Such interference between the passenger's fingers and the B-pillar will typically result in injury to the passenger.

Door closure protection devices are known in the art, but are associated with the closing of the sliding door when the pivoted front door is opened. Other finger protection devices are found in U.S. Pat. No. 2,995,871, granted to John Himka on Oct. 11, 1960, in which a finger guard apparatus is associated with the pivoting of front and rear car doors. In U.S. Pat. No. 6,487,751, granted to Regis Renaud on Dec. 3, 2002, a swinging safety device is loaded on the vehicle door to prevent the door from being fully closed until the extended lever has been manually retracted. U.S. Pat. No. 4,804,223, issued to James Iati on Feb. 14, 1989, discloses first and second flexible strips cooperate to seal the front pivoted door while providing clearance to prevent damage to interfering fingers.

An adjustable bumper assembly in U.S. Pat. No. 5,895,089, issued to Rajinder Singh on Apr. 20, 1999, is mounted perpendicularly to the vehicle body surface to prevent movement of the door once contact has been made, thus preventing injury to fingers due to an unwanted closing of the sliding rear door. U.S. Pat. No. 4,502,246, granted to Tatsuo Minami on Mar. 5, 1985, is directed to a catch lever with a stopper plate and a spring which biases the free end of a hooker portion into engagement with the catch member positioned on the bottom wall of the vehicle to also avoid injuries due to the unwanted closing of a sliding rear door. U.S. Patent Application Publication No. 2003/0085578, published on May 8, 2003, teaches a pair of interrelated members used in conjunction with a latch mechanism such that when the first lever is in a rest position, the second lever is held in a retracted position, and when the first lever is in an actuated position, the second lever is moved into a deployed position.

None of the known prior art teaches a mechanism that prevents the closing of a sliding rear door when the corresponding front door has been opened. Such a mechanism would be desirable to prevent fingers of passengers in the second row of seating from placing their fingers into an interfering position on the B-pillar when the front door has been opened.

SUMMARY OF THE INVENTION

It is an object of this invention to overcome the disadvantages of the prior art by providing a mechanism that interferes with the closing of the front door whenever the sliding rear door has been opened.

It is another object of this invention to provide an apparatus that can prevent damage to the fingers of passengers using the B-pillar for support in exiting a vehicle due to the closing of the front door.

It is a feature of this invention that a bumper is pivoted into an interfering position to prevent the front door from closing against the B-pillar of the vehicle.

It is another feature of this invention that the opening of the rear door actuates the mechanism for pivoting a bumper into an interfering position with the front door.

It is an advantage of this invention that the actuation of an interfering bumper requires the opening of both the front and rear doors.

It is another advantage of this invention that the bumper is not pivoted into an interfering position if only the front door is opened.

It is still another feature of this invention that the mechanism can be adapted for utilization for both a sliding rear door and a pivoting rear door.

It is yet another feature of this invention that a stop lever is incorporated into the mechanism to prevent the pivoting of the bumper if utilization of the mechanism is not desired.

It is yet another feature of this invention that the rear door must be closed before the front door in order to retract the bumper mechanism to enable the front door to close.

It is still another advantage of this invention that the requirement of closing the rear door before permitting the front door to be closed reflects the discontinuing of the need for the passenger in the second row of seating to need the use of the B-pillar for support in exiting the vehicle once the rear door has been closed.

It is a further feature of this invention that the mechanism is spring biased into an interfering position.

It is still a further feature of this invention that the spring bias to pivot the bumper into an interfering position is overcome with the engagement of the rear door with the actuation lever of the mechanism.

It is an aspect of this invention to provide a bumper mechanism operatively engaged with the rear door of an automotive vehicle to affect the pivoting of a bumper into an interfering position with respect to the front door of the vehicle so that the front door cannot be closed against the B-pillar of the vehicle as long as the rear door is opened.

It is another aspect of this invention to provide a spring loaded linkage mechanism that has an actuation lever pivotally supported for engagement with the rear door of an automotive vehicle. The actuation lever moves into an actuation position when the rear door is opened to cause a pivotal movement of a bumper from a retracted position to an interfering position preventing the closing of the front door against the B-pillar. The closing of the rear door returns the actuation lever to an inoperative position causing the pivotal movement of the bumper into the retracted position to permit the front door to be closed.

It is still another aspect of this invention that the spring-loaded linkage mechanism is provided with a pivoted lever that can be placed into a stop position to prevent the pivotal movement of the bumper device into the interfering position even when the rear door is opened.

It is yet another object of this invention to provide a linkage mechanism operatively associated with the front and rear doors of an automotive vehicle that can prevent the closing of the front door when the rear door is opened that is durable in construction, inexpensive of manufacture, carefree of maintenance, facile in assemblage, and simple and effective in use.

These and other objects, features and advantages are accomplished according to the instant invention by providing a linkage mechanism operably associated with the front and rear doors of an automotive vehicle that pivots a bumper device into an interfering position with respect to the closing of the front door against the B-pillar of the vehicle when the rear door remains opened. The linkage mechanism includes a spring-loaded actuation lever that moves in response to the opening of the rear door to cause through connecting links the pivotal movement of the bumper device from a retracted position to an interfering position to interfere with the closing of the front door. The closing of the rear door causes the retraction of the pivoted bumper device to enable the closing of the front door. A manually activated stop lever is pivotally movable against the bumper device to prevent the pivotal movement thereof out of the retracted position even when the rear door is opened.

BRIEF DESCRIPTION OF THE DRAWINGS

The advantages of this invention will become apparent upon consideration of the following detailed disclosure of the invention, especially when taken in conjunction with the accompanying drawings wherein:

FIG. 6 is a schematic rear side elevational view of the linkage mechanism with the pivotable bumper device in the retracted position and the front door being closed; and FIG. 7 is a schematic rear side elevational view similar to that of FIG. 6, but with the bumper member pivoted into the interfering position to prevent the front door from closing against the B-pillar.

DETAILED DESCRIPTION OF THE PREFERRED EMBODIMENT

Figure 1:
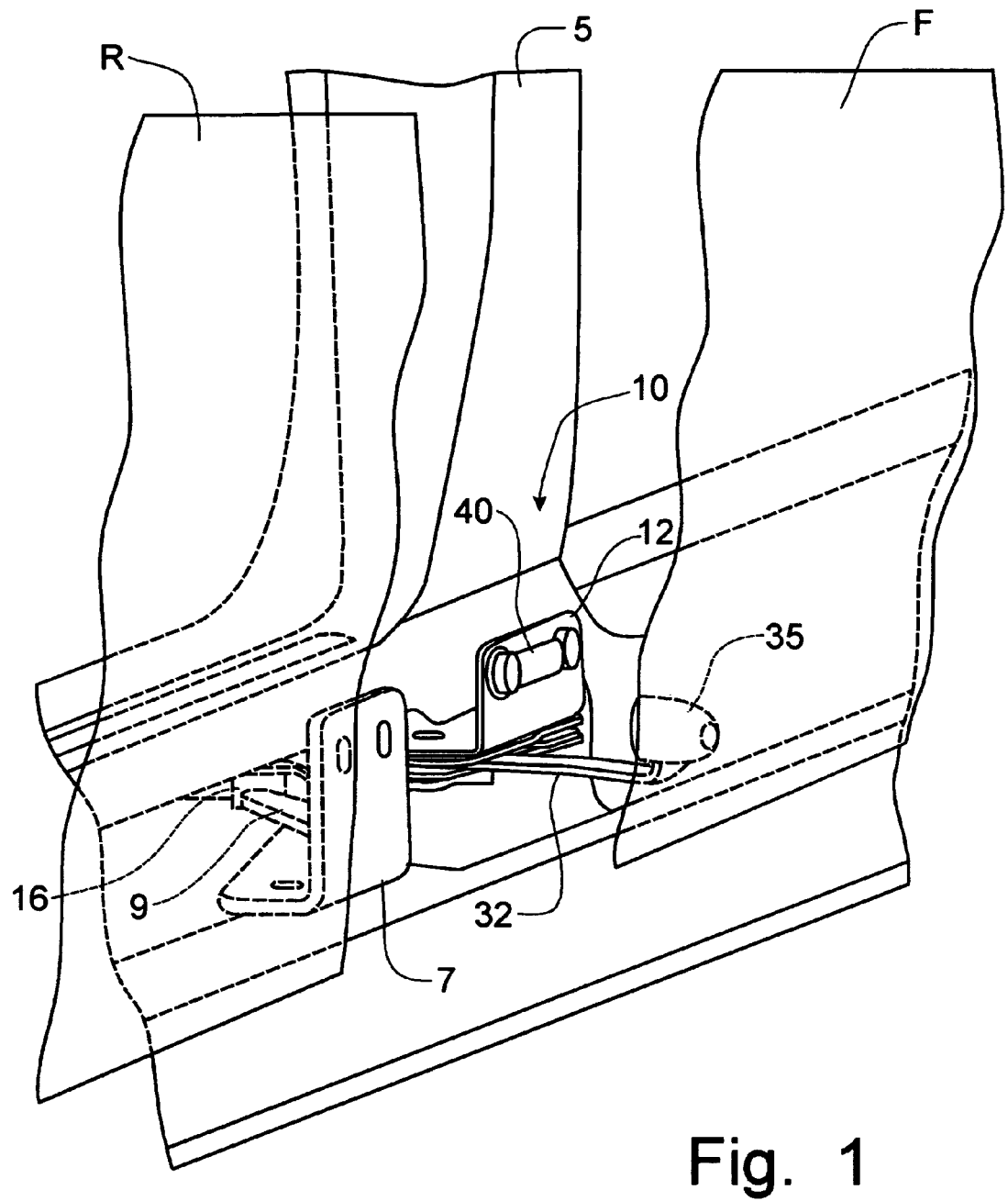
FIG. 1 is a perspective partial view of the lower portion of the B-pillar of an automotive vehicle having a linkage mechanism, incorporating the principles of the instant invention, mounted thereon.

Referring to the drawings, a linkage mechanism for preventing the closure of the front door of an automotive vehicle when the rear door is opened can best be seen. The linkage mechanism 10 can be utilized on either side of the vehicle, but is preferably mounted on the B-pillar 5 of the vehicle frame so as to be operatively associated with both the front and rear doors F, R of the vehicle. The linkage mechanism 10 depicted in the drawings is the preferred embodiment associated with a sliding rear door R, but one of ordinary skill in the art will readily recognize that the movement of the actuation lever ** of the linkage mechanism 10 can be accomplished with a pivoted rear door as well as with a sliding rear door R.

In exiting the second row of seating in the vehicle, which is often the rear seats of the vehicle, people have a tendency to grasp the B-pillar 5 against which the front pivoted door F, and the rear sliding door R, close. If the passenger is attempting to exit the second row of seating, the rear door R will have been opened. If the front door F has also been opened, the passenger is then capable of placing his/her fingers into a position that will be between the front door F and the B-pillar 5 if the front door is closed while the passenger is grasping the B-pillar 5. Accordingly, if the front door F is closed while the passenger is grasping the B-pillar for support while exiting the vehicle, injury to the passenger's fingers is a possibility.

The linkage mechanism 10 is designed to interfere with the closing of the front door F when the rear door R is opened. The linkage mechanism 10 includes a bracket 12 defining the frame for the linkage mechanism 10. The bracket 12 is preferably attached to the bottom of the B-pillar 5 with fasteners 13 to locate the linkage mechanism 10 in an ideal location for operative engagement with both the front and rear doors F, R of the vehicle, as will be described in greater detail below. The rear door R is preferably of the sliding variety, such as is typically found on vans and mini-vans, which close upon forward movement of the rear door R toward and against the B-pillar 5. The rear door R includes a support bracket 7 that has mounted thereon an actuation member 9, which has been added to the support bracket 7 according to the principles of the instant invention.

Figure 2:
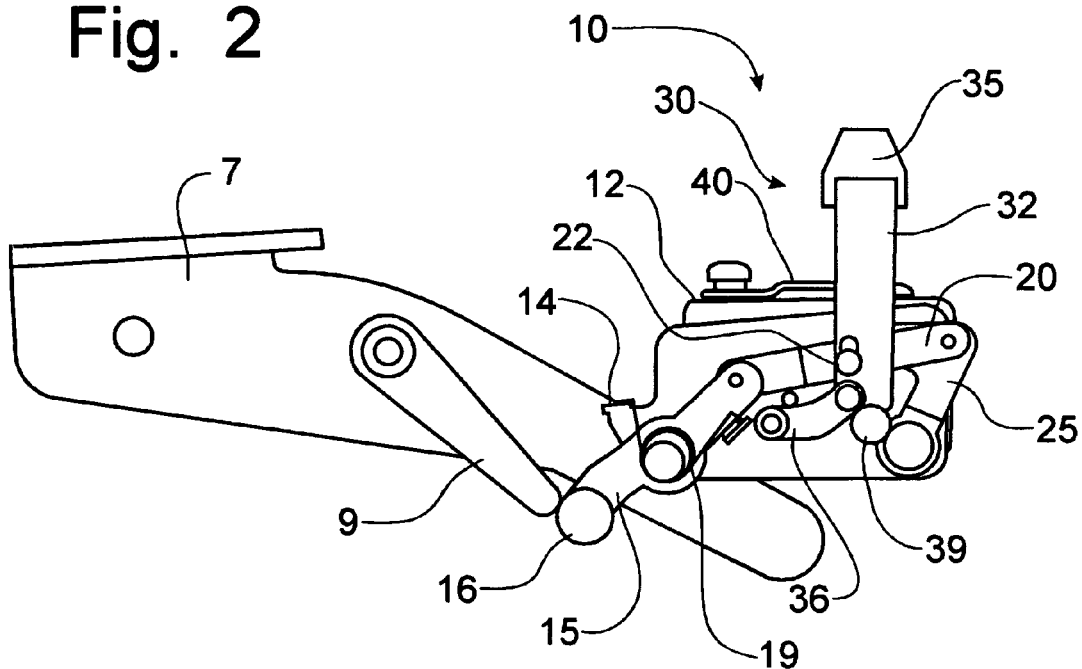
FIG. 2 is a bottom plan view of the linkage mechanism in the interfering position, the support bracket for the mounting of the rear door on a slide mechanism being shown in engagement with the actuation lever of the linkage mechanism.

The linkage mechanism 10 includes an actuation lever 15 preferably having a roller 16 supported on the distal end thereof for engagement with the actuation member 9 on the sliding rear door R. The actuation lever 15 is pivotally movable about a pivot 17 on which is mounted a torsion spring 19 engagable between a stop 18 on the actuation lever and a stop 14 on the bracket to bias the pivotal movement of the actuation lever 15 into an operative position, as shown in FIG. 2. The actuation lever 15 is restrained in an inoperative position, shown in FIG. 3, by the actuation member 9 engaged therewith when the rear door R is closed, thereby overcoming the biasing force exerted by the torsion spring 19. When the rear door R is opened, the actuation member 9 moves rearwardly allowing the biasing force exerted by the torsion spring 19 to pivot the actuation lever 15 into the operative position. The actuation lever 15 is pivotally connected to a first end of a connecting link 20 which has pivotally connected at the distal second end to a control link 25 that is pivotally mounted on the bracket 12 by the pivot 26.

The linkage mechanism 10 also includes a bumper device 30 formed of a support member 32 and an elastomeric bumper head 35. The bumper device 30 is pivotally connected to the connecting link 20 and to an orientation control link 36 which is pivotally supported on the bracket 12 by the pivot 38. The connecting link 20 carries a driving pin 22 which is pivotally connected to the support member 32 of the bumper device 30 to transfer movement of the actuation lever 15 through the connecting link 20 to affect movement of the support member 32. Since the support member 32 is connected to both the connecting link 20 and the orientation control link 36, the forwardly moving connecting link 20 causes the support member to pivot about the drive pin 22 and the pivotal connection 38 with the orientation control link 36.

Figure 3:
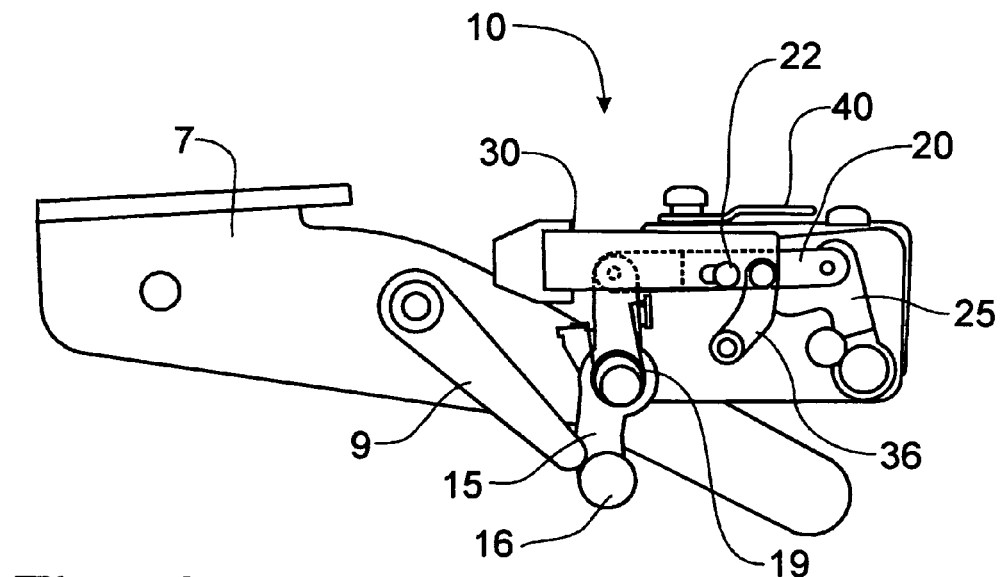
FIG. 3 is a bottom plan view of the linkage mechanism in the retracted position, the support bracket for the mounting of the rear door on a slide mechanism being shown in engagement with the actuation lever of the linkage mechanism.

The orientation control link 36 controls the orientation of the support member 32. By rotating about the pivot 37 and by allowing the support member 32 to rotate about the pivot 38, the drive pin 22 pushes the support member 32 through an angular displacement of approximately ninety degrees from a retracted position, as shown in FIG. 3 oriented generally parallel to the front door F, to an interfering position, as shown in FIG. 2 oriented generally perpendicularly to the front door F. In this interfering position, the bumper head 35 projects outwardly beyond the B-pillar and prevents the front door F from closing against the B-pillar and latching into a closed position. Thus, if a rear passenger's fingers were wrapped around the B-pillar, the front door F wouldn't be able to close on them.

The orientation control link 36 is free to pivot forwardly about the pivot 38 until the support member 32 abuts a stop 39 affixed to the bracket 12 adjacent the control link 25 which is operable to keep the connecting link 20 moving in a general fore-and-aft direction in response to the pivotal movement of the actuation lever 15. When the support member 32 abuts the stop 39, the support member 32 has undergone the angular displacement of about ninety degrees into the interfering position. The return of the support member 32 into the retracted position is just the opposite of the above description. The actuation member 9, upon the closing of the rear door R, engages the roller 16 and pushes the actuation member against the biasing force exerted by the spring 19, driving the connecting link 20 rearwardly and affecting the angular displacement of the support member 32 into the retracted position.

Figure 4:
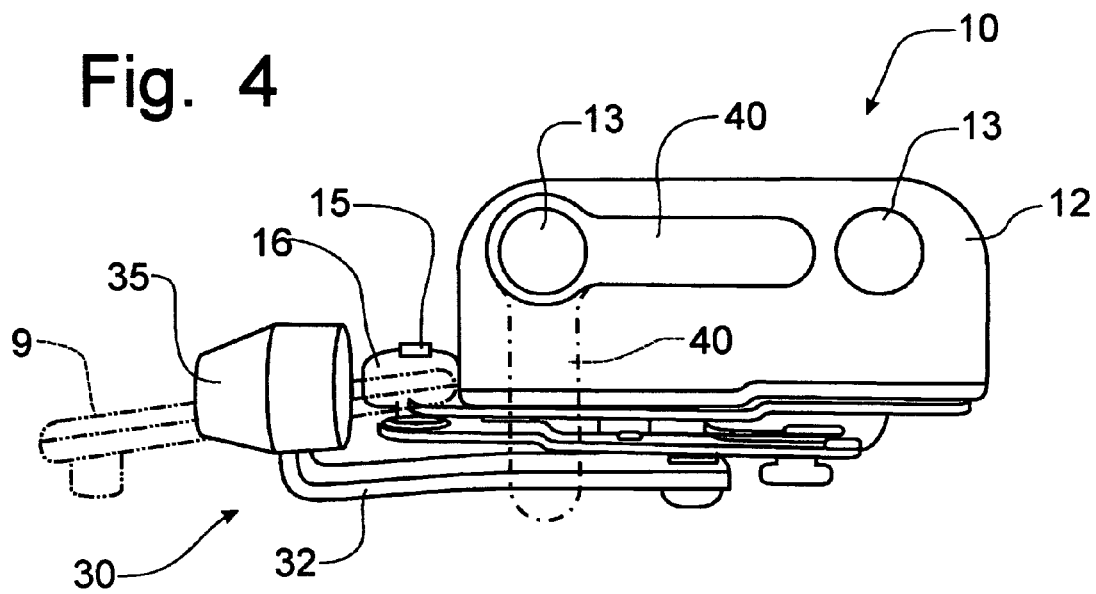
FIG. 4 is a front elevational view of the linkage mechanism shown in FIGS. 2 and 3 with the bumper device located in the retracted position, the pivotal movement of the stop lever being shown in phantom, and the rear door actuation member also being shown in phantom.
Figure 5:
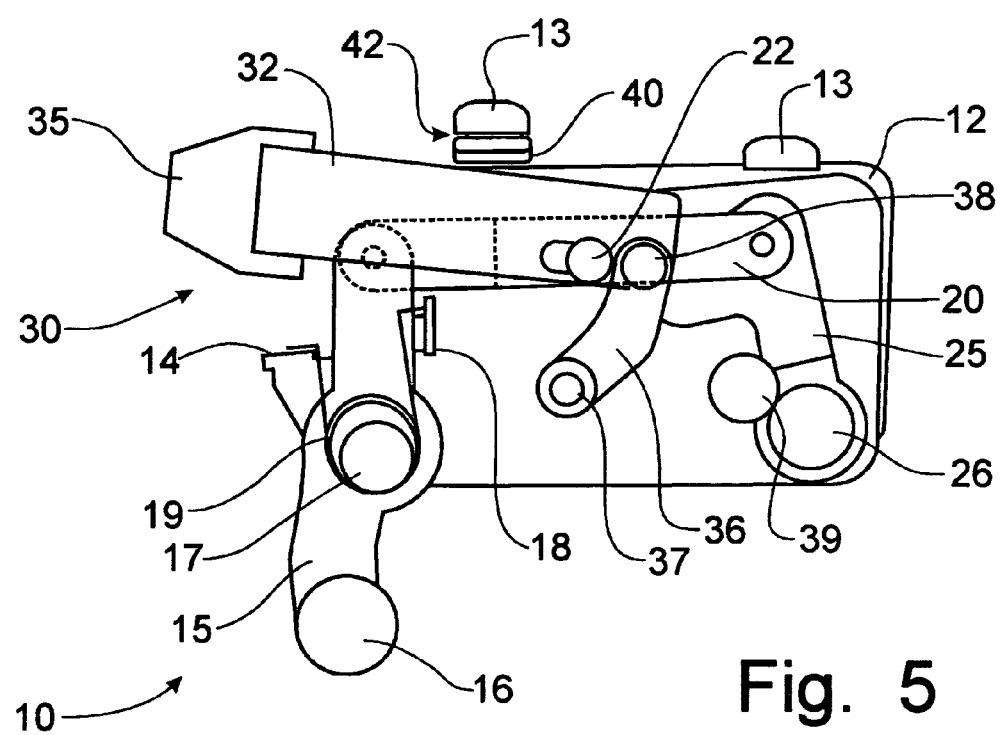
FIG. 5 is a bottom plan view of the linkage mechanism shown in FIG. 4 but with the stop lever activated to prevent pivotal movement of the bumper device into the interfering position.

As is best seen in FIGS. 4 and 5, the linkage mechanism 10 is also provided with a stop lever 40 that is pivotally mounted on the support bracket 12 by one of the fasteners 13. A tensioning device 42, such as a spring, may be necessary to restrict the pivot movement of the stop lever 40 except as is intentionally manually accomplished. The stop lever 40 is movable from the operating position depicted in solid lines in FIG. 4 to a stop position depicted in phantom lines in FIG. 4. Once manually positioned into the stop position, the stop lever 40 interferes with the pivotal movement of the support member 32 to undergo the angular displacement needed to move from the retracted position into the interfering position.

Once in the stop position, the stop lever 40 prevents the entire linkage mechanism 10 from operating, as is depicted in FIG. 5. Thus, when the actuation member 9 moves rearwardly with the opening of the sliding rear door R, the actuation lever 15 cannot substantially move about its pivot 17 as its interconnected connecting link 20 and support member 32 are not free to move in response to the movement of the actuation lever 15.

Furthermore, if the front door F remains in the closed position while the sliding rear door R is opened, the support member 32 bumps into the closed front door F, and is unable to move through the required angular displacement because of a lack of clearance. In essence, the closed front door F acts as a temporary stop lever 40 preventing the linkage mechanism 10 from operating. Thus, if the front door remains closed, the actuation lever 15 remains in the inoperative position. After the rear door R has been opened, the biasing force exerted by the torsion spring 19 will activate the linkage mechanism 10 as soon as the front door is opened, thus providing clearance for the movement of the support member 32.

If the front door F is opened without the rear door R being opened, the linkage mechanism 10 will not be activated because the actuation member 9 retains the actuation lever 15 in the inoperative position against the force exerted by the torsion spring 19. Once the front door F has been opened, however, a subsequent opening of the rear door R will activate the linkage mechanism 10 to pivot the support member 32 into the interfering position. Once the support member has been deployed into the interfering position, the rear door R will have to be closed before the front door F so that the support member 32 will be re-oriented into its retracted position, permitting the front door to close against the B-pillar.

The operation of the linkage mechanism 10 is automatic with the opening of the front and rear doors, unless the stop lever 40 has been moved into its stop position. If only one of the front and rear doors is opened, the linkage mechanism 10 will not deploy the bumper device 30 into the interfering position.

One skilled in the art will readily recognize that the preferred embodiment described above is designed for utilization with a sliding rear door R. A slight modification to the actuation member 9 and the deployment with the actuation lever 15 will enable the linkage mechanism 10 to be utilized with a pivoted rear door R. The key operative factor is that the movement of the rear door R from a closed position to an opened position needs to activate the deployment of the linkage mechanism 10, whether the front door F is opened before or after the opening of the rear door R.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A finger protection apparatus for an automobile having a frame including a B-pillar located between a front door and a rear door, both said front and rear doors being movable between a closed position and an opened position, said front door being closed against said B-pillar when in said closed position, comprising:
   a support bracket connectable to said frame adjacent said B-pillar;
   an actuation lever pivotally mounted on said support bracket for movement between an inoperative position and an operative position;

a spring for biasing said actuation lever toward said operative position; and a bumper device pivotally supported on said support bracket for movement between a retracted position and an interfering position in which said bumper device prevents said front door from closing against said B-pillar, said actuation lever being coupled to said bumper device to affect movement of said bumper device from said retracted position into said interfering position in response to the movement of said actuation lever into said operative position.

2. The finger protection apparatus of claim 1 wherein said spring is connected to a spot on said actuation lever to bias the pivotal movement thereof toward said operative position.

3. The finger protection apparatus of claim 1 wherein said bumper device includes a support member, said actuation lever being connected to said support member by a connecting link to transfer movement of said actuation lever to said support member.

4. The finger protection apparatus of claim 3 wherein said support member is pivotally mounted for movement through an angular displacement of approximately ninety degrees in moving from said retracted position to said interfering position.

5. The finger protection apparatus of claim 4 wherein said support member is pivotally connected to an orientation control link pivotally mounted on said support bracket, said orientation control link forcing said support member to undergo angular displacement when moved in response to movement of said actuation lever.

6. The finger protection apparatus of claim 1 further comprising a stop lever manually movable between an operating position and a stop position, said stop lever being operable to restrain movement of said bumper device when in said stop position.

7. The finger protection apparatus of claim 4 further comprising a stop lever manually movable between an operating position and a stop position, said stop lever being mounted on said support bracket and being operable to prevent said support member from undergoing angular displacement into said interfering position.

8. In an automotive vehicle having a frame including a B-pillar; a pivotally mounted front door movable between an opened position and a closed position in which said front door is positioned against said B-pillar; a rear door mounted for sliding movement between an opened position and a closed position against said B-pillar, said rear door including an actuating member movable with said rear door, the improvement comprising:

a linkage mechanism mounted to said B-pillar to operatively engage said rear door so as to prevent said front door from closing against said B-pillar when said rear door is opened.

9. The automotive vehicle of claim 8 wherein said linkage mechanism comprises:

a support bracket connectable to said B-pillar;

an actuation lever pivotally mounted on said support bracket for movement between an inoperative position and an operative position, said actuation lever being positioned for engagement with said actuation member movable with said rear door;

a spring for biasing said actuation lever toward said operative position; and a bumper device pivotally supported on said support bracket for movement between a retracted position and an interfering position in which said bumper device prevents said front door from closing against said B-pillar, said actuation lever being coupled to said bumper device to affect movement of said bumper device from said retracted position into said interfering position in response to the movement of said actuation lever into said operative position.

10. The automotive vehicle of claim 9 wherein said bumper device includes a support member, said actuation lever being connected to said support member by a connecting link to transfer movement of said actuation lever to said support member.

11. The automotive vehicle of claim 10 wherein said support member is pivotally connected to an orientation control link pivotally mounted on said support bracket, said orientation control link forcing said support member to undergo angular displacement of approximately ninety degrees in moving from said retracted position to said interfering position in response to movement of said actuation lever.

12. The automotive vehicle of claim 11 wherein said spring is mounted on a spot on said actuation lever to bias the pivotal movement thereof toward said operative position.

13. The automotive vehicle of claim 12 further comprising a stop lever manually movable between an operating position and a stop position, said stop lever being mounted on said support bracket and being operable to prevent said support member from undergoing angular displacement into said interfering position.

14. The automotive vehicle of claim 13 wherein said spring is a torsion spring anchored between a stop formed on said support bracket and a stop formed on said actuation lever.

15. A method of restraining closure of a front door on an automobile having a frame including a B-pillar against which said front door closes, and a rear door movable between a closed position and an opened position, said rear door including an actuation member movable with said rear door, comprising the steps of:

preventing said front door from closing against said B-pillar when said rear door is in said opened position with a linkage mechanism operably associated with said rear door.

16. The method of claim 15 wherein said preventing step includes the steps of:

pivoting a bumper device from a retracted position into an interfering position in response to an actuation lever moving from an inoperative position to an operative position, said interfering position preventing said front door from closing against said B-pillar.

17. The method of claim 16 wherein said actuation lever is biased by a spring toward said operative position, said pivoting step being accomplished by said actuation member allowing said actuation lever to move into said operative position as said rear door is moved to said opened position.

18. The method of claim 17 further comprising the step of permitting said front door to close against said B-pillar after said rear door has been moved into said closed position.

19. The method of claim 18 wherein said permitting step includes the step of pushing said actuation member against said actuation lever with the closing of said rear door to force said actuation lever from said operative position into said inoperative position against the biasing force exerted by a spring.

20. The method of claim 16 wherein said pivoting step includes the steps of:

driving a connecting link pivotally interconnecting said actuation lever and a support member to transfer movement of said actuation lever to said support member; and controlling the movement of said support member by an orientation control link pivotally mounted on a support bracket to force said support member to under go an angular displacement of approximately ninety degrees from said retracted position to said interfering position.

* * * * *